US011449607B2

United States Patent
Annen et al.

(10) Patent No.: US 11,449,607 B2
(45) Date of Patent: Sep. 20, 2022

(54) ANOMALY AND RANSOMWARE DETECTION

(71) Applicant: Rubrik, Inc., Palo Alto, CA (US)

(72) Inventors: Oscar Annen, San Jose, CA (US); Di Wu, Newark, CA (US); Ajay Saini, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 490 days.

(21) Appl. No.: 16/534,486

(22) Filed: Aug. 7, 2019

(65) Prior Publication Data

US 2021/0042411 A1 Feb. 11, 2021

(51) Int. Cl.
*G06F 21/56* (2013.01)
*G06N 20/00* (2019.01)

(52) U.S. Cl.
CPC .......... *G06F 21/565* (2013.01); *G06F 21/561* (2013.01); *G06N 20/00* (2019.01); *G06F 2221/033* (2013.01)

(58) Field of Classification Search
CPC ................................................. G06F 21/565
See application file for complete search history.

(56) References Cited

U.S. PATENT DOCUMENTS

| | | | |
|---|---|---|---|
| 7,802,300 B1 | 9/2010 | Liu et al. | |
| 7,962,956 B1 | 6/2011 | Liao et al. | |
| 9,516,053 B1 | 12/2016 | Muddu et al. | |
| 9,779,240 B2 | 10/2017 | Feroz et al. | |
| 10,572,993 B2* | 2/2020 | Tanaka | G06N 3/088 |
| 2006/0074824 A1* | 4/2006 | Li | G06F 16/2465 |
| | | | 706/20 |
| 2019/0235973 A1 | 8/2019 | Brewer et al. | |
| 2019/0354850 A1* | 11/2019 | Watson | G06N 3/08 |
| 2020/0004808 A1* | 1/2020 | Yao | G06F 40/106 |
| 2020/0042703 A1 | 2/2020 | Herman Saffar et al. | |
| 2021/0089957 A1* | 3/2021 | Ermans | G06K 9/6267 |

OTHER PUBLICATIONS

U.S. Appl. No. 16/534,479, filed Aug. 7, 2019, Pending, Anomaly and Ransomware Detection.

* cited by examiner

*Primary Examiner* — Simon P Kanaan
(74) *Attorney, Agent, or Firm* — Holland & Hart LLP

(57) ABSTRACT

Some examples relate generally to computer architecture software for information security and, in some more particular aspects, to machine learning based on changes in snapshot metadata for anomaly and ransomware detection in a file system.

18 Claims, 17 Drawing Sheets

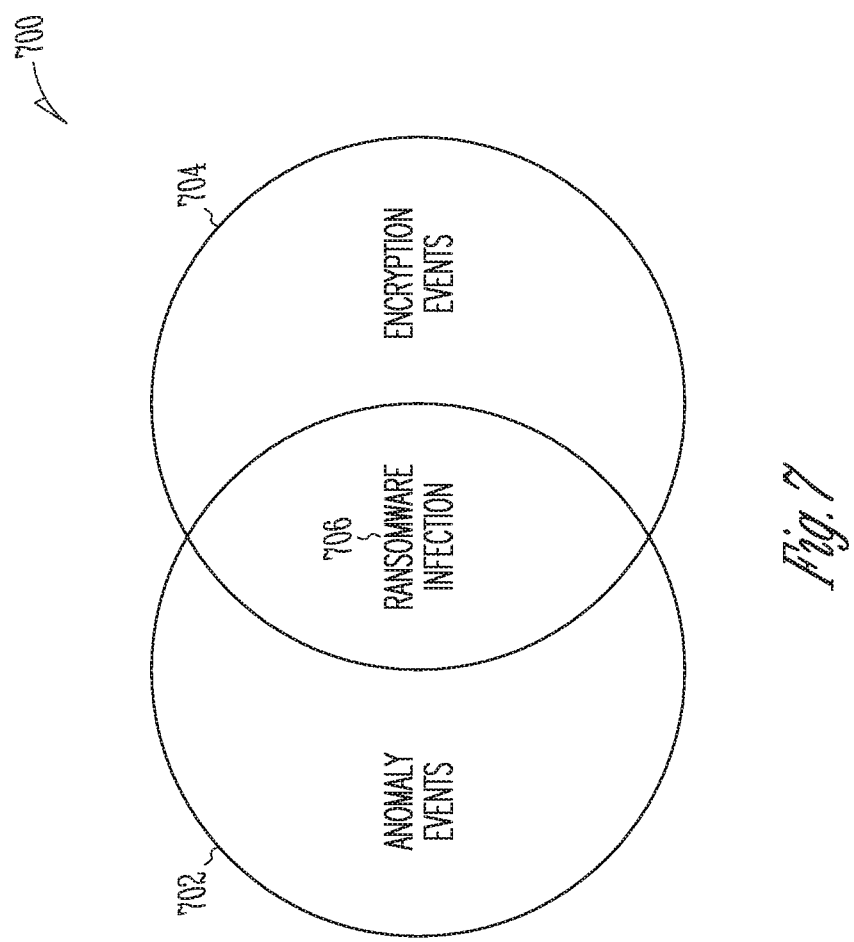

```
67  {"path": "\Users\Windows\Desktop\target", "inode": {"stat": {} "mode": "000041ff",
    "mtime": "2018-01-12_13:10:42", "size": 518, "acl": {} "mode": "000041ff", "uid": 0,
    "gid": 0, "cifs_attr": 0 }}}

68  {"path": "\Users\Windows\Desktop\target\fs0_0.target", "inode: {"stat": {"mode":
    "000081ff", "mtime": "2018-01-12_13:10:42", "size": 6, "acl": {} "mode": "000081ff",
    "uid": 0, "gid: 0, "cifs_attr": 0 }}, "bytes_changed": 6 }}

69  {"path": "\Windows\Temp", "inode": {"stat": {} "mode": "000041ff", "mtime":
    "2018-01-12_13:10:12", "size": 2503224, "acl": {} "mode": "000041ff", "uid": 0, "gid": 0,
    "cifs_attr": 0 }}}
```

*Fig. 8*

77 {"value": {"entropy_128": "5.364138505482046", "entropy_256": "5.611384088755264", "entropy_512": "5.791241747107691"}, "magic_type": "data"}, "key": "/Users/Windows/Desktop/sstable/fs0_1_0.sstable"}

78 {"value": {"entropy_128": "2.584962500721156", "entropy_256": "2.584962500721156", "entropy_512": "2.584962500721156"}, "magic_type": "ASCII text"}, "key": "/Users/Windows/Desktop/target/fs0_1.target"}

Fig. 9

ANOMALY AND RANSOMWARE DETECTION

FIELD

The present disclosure relates generally to computer architecture software for information security and, in some more particular aspects, to machine learning on snapshot metadata for anomaly and ransomware detection in a file system.

BACKGROUND

Ransomware has become a major cyber-security threat over the past few years. It is estimated to have cost enterprises upwards of $5 billion in damages annually. A significant issue in failing to detect ransomware is the prevalent use by data security vendors of signature-based approaches to malware detection. While this approach may be effective for some malware detection, it is not as reliable for ransomware detection because it is easy for a bad actor to release a new variant of ransomware with a different signature and thereby escape detection. Some newer data security products have introduced machine learning-based behavioral analysis to combat this signature modification, but these approaches can be computationally expensive, particularly in a production environment.

SUMMARY

Some examples described in this disclosure leverage machine learning to detect anomalies and ransomware on data backups with little or no impact on production systems. The design of some examples is based on a hybrid-cloud architecture for maximal computational scaling. Such examples take advantage of snapshot metadata computed by enterprise backup systems to minimize computational overhead while delivering high-precision prediction results. In some examples, significant computational processing is offloaded to a cloud-based software-as-a-service (SaaS) platform to further reduce computational stress placed on a primary machine being backed up.

In an example embodiment, an anomaly and ransomware detection system is provided. The system may comprise: a storage device configured to store a base file or snapshot of a primary machine; and one or more processors in communication with the storage device and a production system, the one or more processors configured to perform anomaly and ransomware operations including, at least: taking a first snapshot of a primary machine; storing the first snapshot in the storage device; taking a second snapshot of the primary machine; storing the second snapshot in the storage device; identifying changes in filesystem metadata based on the first and second snapshots; generating training data based on the changes in the filesystem metadata; and training one or more machine-learning models using the training data.

In some examples, the storage device is a backup storage device and the identified changes are sourced from a backup system that includes the backup storage device. In some examples, the anomaly and ransomware detection operations are performed without impacting the production system, in some examples, at least some of the anomaly and ransomware detection operations are offloaded to a cloud-based software-as-a-service platform. In some examples, the one or more machine-learning models include an anomaly model and/or an encryption model. In some examples, the training of the one or more machine-learning models is based on training data derived solely on the snapshot-based metadata.

In another example embodiment, an anomaly and ransomware detection system may comprise: a storage device configured to store a base file or snapshot of a primary machine; and one or more processors in communication with the storage device and a production system, the one or more processors configured to perform anomaly and ransomware detection operations including, at least: taking a first snapshot of a primary machine; storing the first snapshot in the storage device; taking a second snapshot of the primary machine; storing the second snapshot in the storage device; generating or accessing a diff FMD file (as described below) including filesystem metadata based at least partially on a difference between the first and second snapshots; generating training data based on the filesystem metadata; and training one or more machine-learning models using the training data.

In some examples, the storage device is a backup storage device and the generated or accessed metadata is received from a backup system that includes the backup storage device. In some examples, the anomaly and ransomware detection operations are performed without impacting the production system. In some examples, at least some of the anomaly and ransomware detection operations are offloaded to a cloud-based software-as-a-service platform. In some examples, the one or more machine-learning models include an anomaly model and/or an encryption model. In some examples, the training of the one or more machine-learning models is based on training data derived solely on the snapshot-based metadata.

In yet another example embodiment, a filesystem metadata augmentation technique (FMAT) system is provided. The system may comprise a memory; and one or more processors configured to perform training data augmentation operations including, at least: generating or accessing a normal diff MED file sampled from a first seed dataset and sampling a certain number of lines (according to some probability distribution) from the diff FMD file; generating or accessing a prototype diff file sampled from a second seed dataset and sampling a certain number of lines according to a probability distribution from the prototypical diff FMD file; creating a new diff MID file containing the lines sampled from each of the two aforementioned diff FMD files; and repeating to create a new diff DAD file for every diff FMD file in the first seed dataset to generate or augment training data for one or more machine-learning models.

In some examples, the first seed dataset corresponds to a negative target class. In some examples, the second dataset corresponds to a positive target class. In some examples, the training data augmentation operations are performed by a backup system without impacting production operations in a production system served by the backup system. In some examples, at least some of the training data augmentation operations are offloaded by the FMAT system to a cloud-based computing platform. In some examples, the one or more machine-learning models include an anomaly model and/or an encryption model.

DESCRIPTION OF THE DRAWINGS

Some embodiments are illustrated by way of example and not limitation in the figures of the accompanying drawings:

FIG. 7 depicts a categorization of an anomaly and ransomware detection pipeline, according to an example embodiment.

FIG. 8 depicts example contents of a diff FMD file, according to an example embodiment.

FIG. 9 depicts example contents of an RST file, according to an example embodiment.

DESCRIPTION

Figure 1:
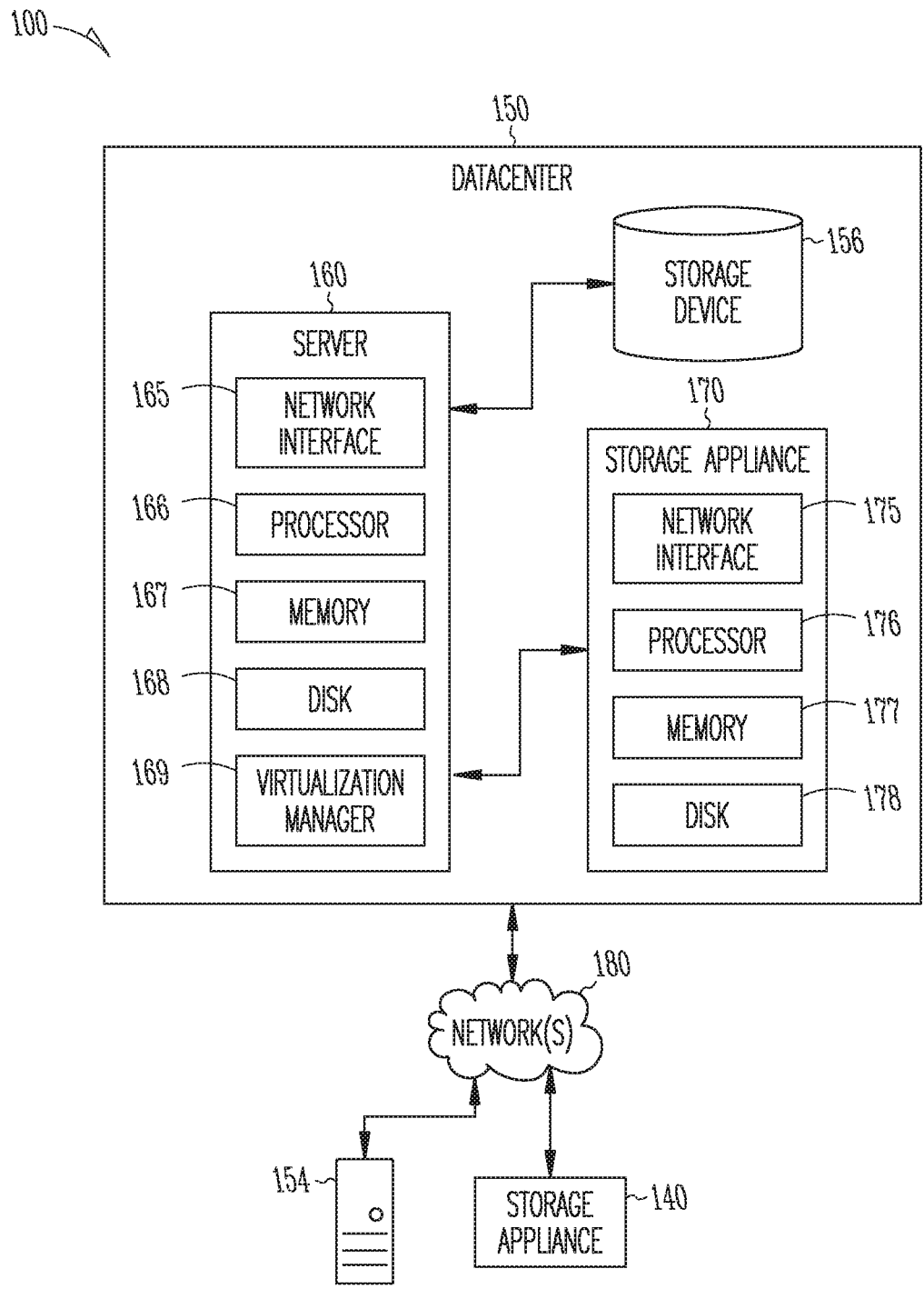
FIG. 1 depicts one embodiment of a networked computing environment in which the disclosed technology may be practiced, according to an example embodiment.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present subject matter may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2018-2019, All Rights Reserved.

FIG. 1 depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may also include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive (HDD), a solid-state drive (SSD), or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure.

The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a Network Attached Storage (NAS) device. In some cases, a data center, such as data center 150, may include thousands of servers and/or data storage devices in communication with each other. The one or more data storage devices 156 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server 160 may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc. Disk 168 may include a HDD and/or a SSD. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine having a virtual disk into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 169 may then transfer data associated with the virtual machine (e.g., an image of the virtual machine or a portion of the image of the virtual disk file associated with the state of the virtual disk at the point in time is was frozen) to a storage appliance (for example, a storage appliance 140 or 170 of FIG. 1, described further below) in response to a request made by the storage appliance. After the data associated with the point in time snapshot of the virtual machine has been transferred to the storage appliance 170 (for example), the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of a storage appliance 170 (or 140) includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a HHD and/or a SSD. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different points in time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing SaaS or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and fifes, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface (GUI)) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

Figure 2:
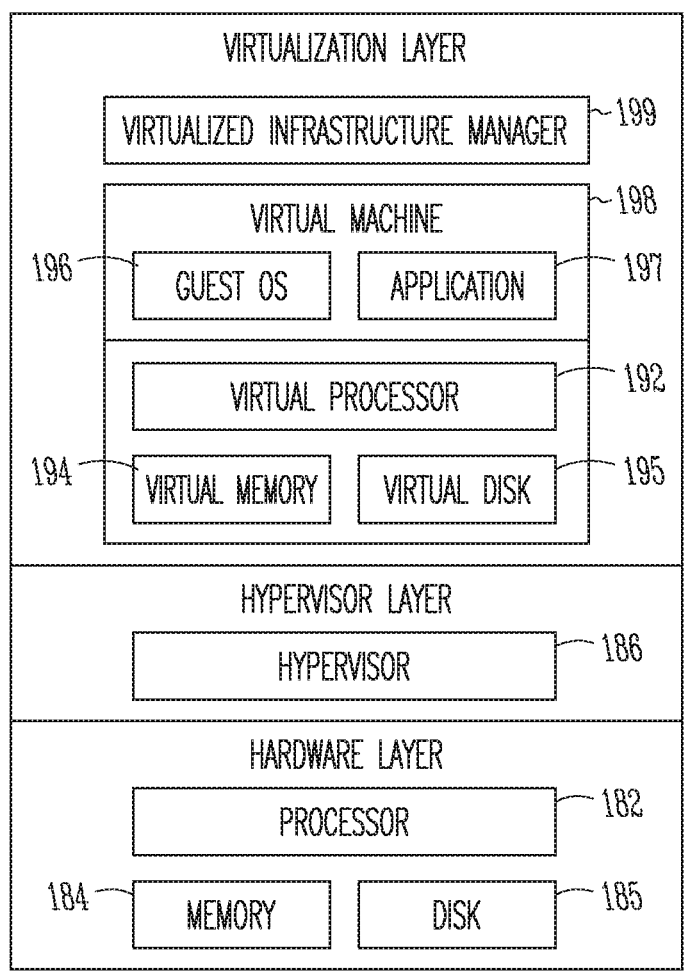
FIG. 2 depicts one embodiment of the server in FIG. 1, according to an example embodiment.

FIG. 2 depicts one embodiment of server 160 in FIG. 1. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memories 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine 198 may include a plurality of virtual disks 195, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1, may run on a virtual machine or natively on the server 160. The virtual machine may, for example, be or include the virtual machine 198 or a virtual machine separate from the server 160. Other arrangements are possible. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1 or storage appliance 170 in FIG. 1, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a timestamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance 140 or 170 of FIG. 1 or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 may or the hypervisor 186 may communicate with a storage appliance, such as storage appliance 140 in FIG. 1 or storage appliance 170 in FIG. 1, using a distributed file system protocol such as NFS Version 3 or Server Message Block (SMB) protocol. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 3:
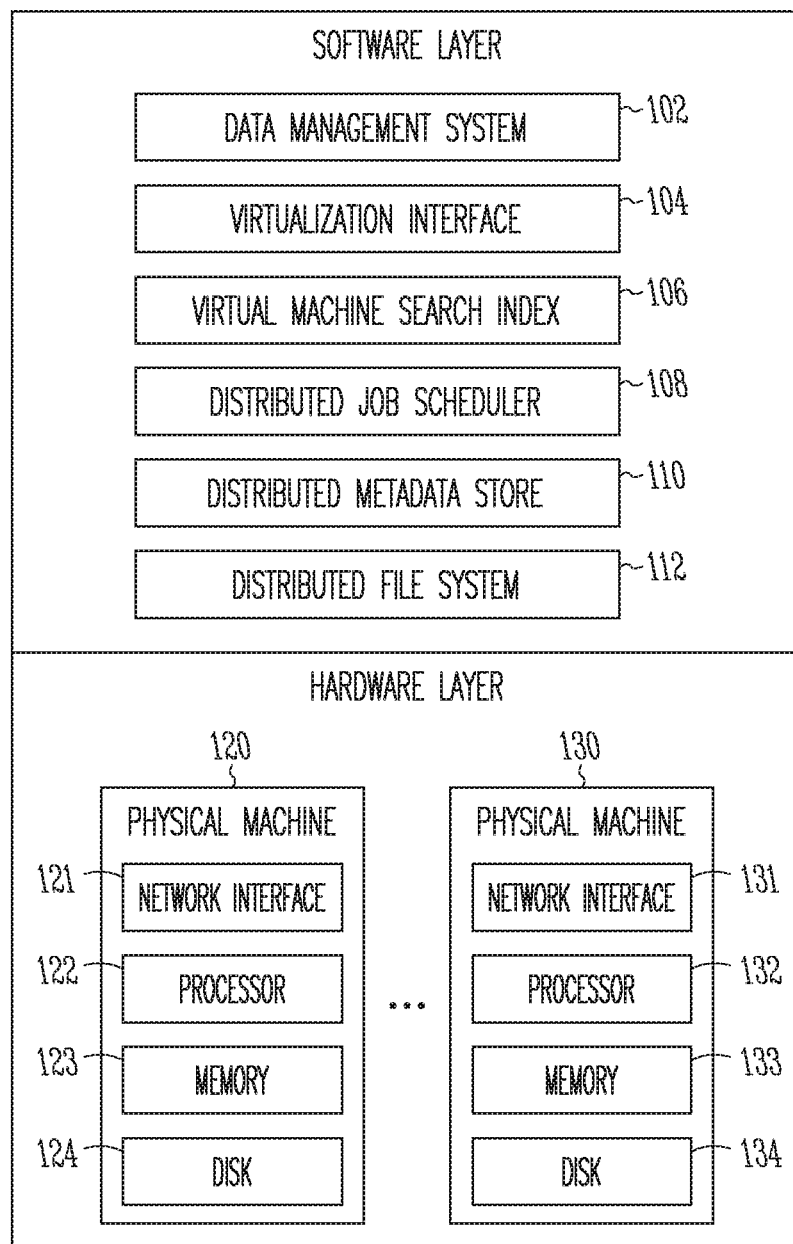
FIG. 3 depicts one embodiment of the storage appliance 170 in FIG. 1, according to an example embodiment.

FIG. 3 depicts one embodiment of storage appliance 170 in FIG. 1. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a HDD and/or a SSD. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a HDD and/or a SSD. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 108 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1, or a hypervisor, such as hypervisor 186 in FIG. 2, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 2, may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established, in one example, given a number (N) of nodes in a cluster from node(0) to node(N-1), for a floating IP address (i), the VRRP priority of nodeG) may be G-i) modulo N. In another example, given a number (N) of nodes in a cluster from node(0) to node(N-1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VMA/s2/).

The distributed file system 112 may present itself as a single file system, in which, as new physical machines or nodes are added to the storage appliance 170, the cluster may automatically discover the additional nodes and automatically increase the available capacity of the file system for storing files and other data. Each file stored in the distributed file system 112 may be partitioned into one or more chunks or shards. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster, and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incremental aspects derived from the single frill image snapshot. The single full image snapshot of the virtual machine may be stored using a first storage device of a first type (e.g., an HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from an HDD) to acquire the full image and, in parallel, performing one or more reads from the second storage device (e.g., performing fast random reads from an SSD) to acquire the one or more incremental aspects.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at a particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a duster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to dean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 2, to create a frozen copy of the virtual machine and to transfer one or more chunks (or one or more files) associated with the frozen copy to a storage appliance, such as storage appliance 170 in FIG. 1. The one or more tasks may also include generating metadata for the one or more chunks, storing the metadata using the distributed metadata store 110, storing the one or more chunks within the distributed file system 112, and communicating with the virtualized infrastructure manager 199 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 112 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 2, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 3.

The data management system 102 may comprise an application running on the storage appliance that manages and stores one or more snapshots of a virtual machine. In one example, the data management system 102 may comprise a highest-level layer in an integrated software stack running on the storage appliance. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a fa image of the version of the virtual machine.

Figure 4:
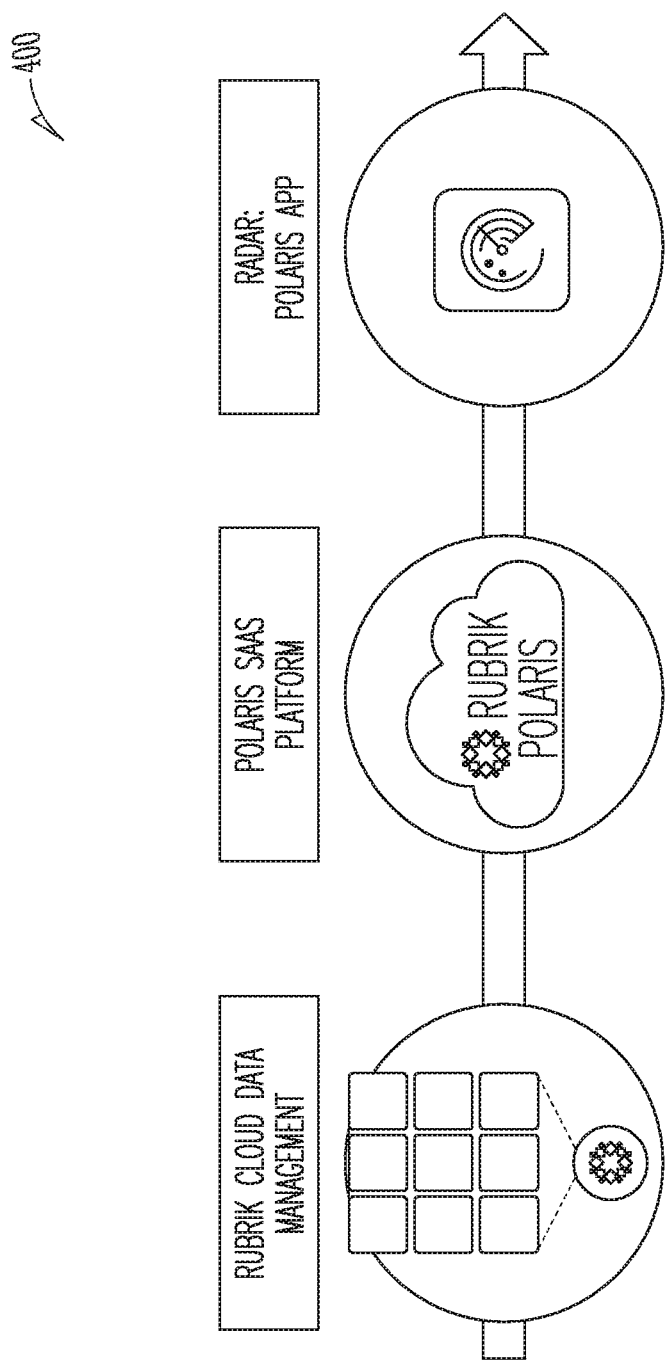
FIG. 4 depicts a high-level overview of example ransomware detection software architecture, according to an example embodiment.

A high-level overview of example anomaly and ransomware detection software architecture 400 is shown in FIG. 4. As mentioned above, some example anomaly and ransomware detection systems described herein leverage machine learning to detect anomalies and ransomware on data backups with little or no impact on production systems. Ransomware may be characterized by an encryption profile in some instances. Some example anomaly and ransomware detection systems or applications of the present disclosure include or are based on a hybrid-cloud architecture to enable computational scaling. Some examples utilize snapshot metadata computed by a data backup system to minimize computational overhead while delivering high-precision prediction results. In some examples, significant computational processing is offloaded to a cloud-based SaaS platform to reduce computational stress placed on a primary machine being backed up.

Figure 5:
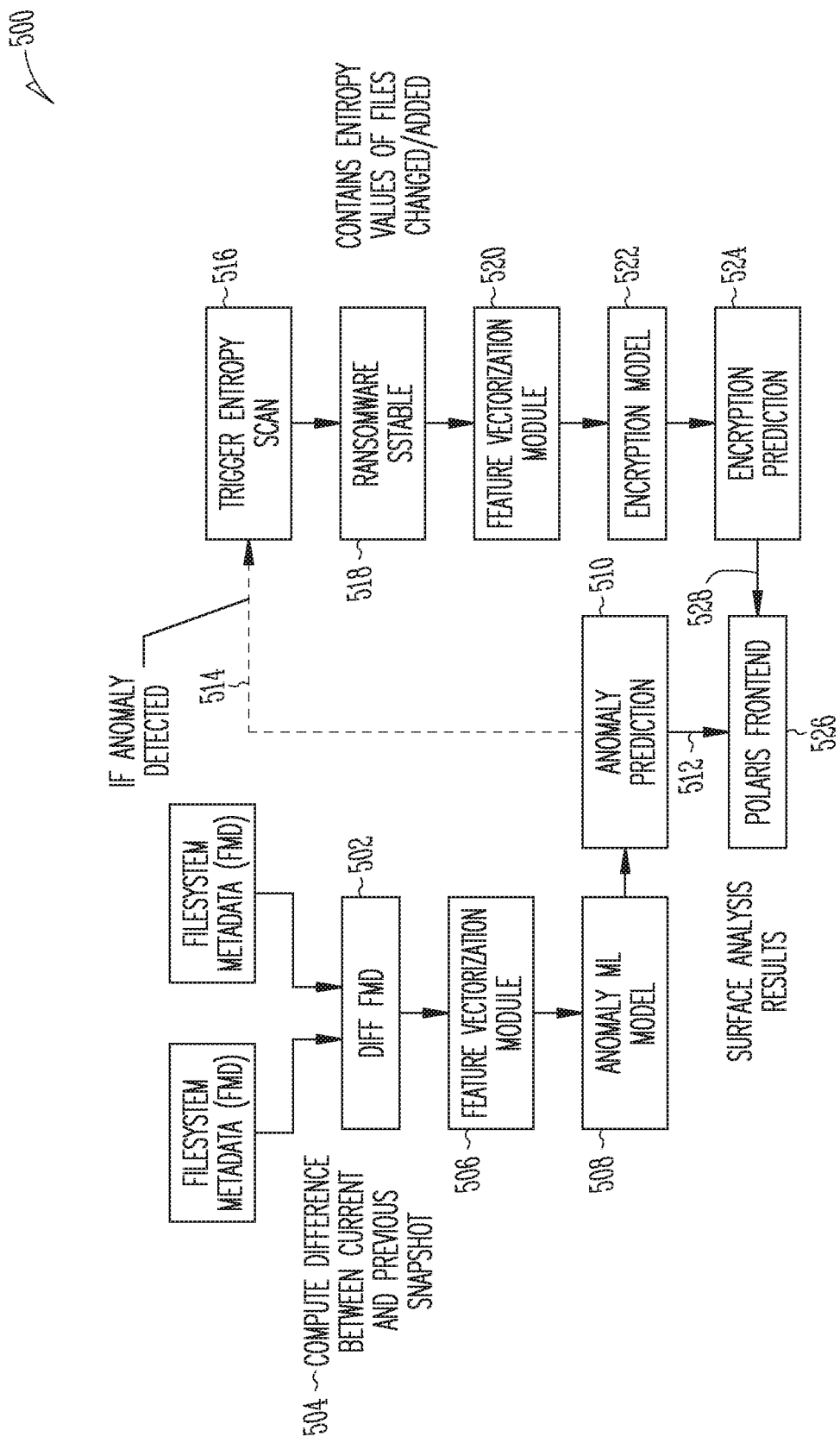
FIG. 5 depicts example workflow operations in an anomaly and ransomware (encryption) detection pipeline, according to an example embodiment.

Example workflow operations in an overview of an example anomaly and ransomware detection pipeline 500 are shown in FIG. 5. The pipeline 500 may include first and second machine learning systems in some examples. In the illustrated example, a filesystem metadata diff (diff FMD) file 502 is created by a data backup system (for example, overseen by the virtualization manager 169 described further above) whenever a snapshot is taken for a primary machine. The diff FMD file 502 contains a list of entries 504 corresponding to files that have been created, deleted, or modified, and may include a log of all file changes that have taken place on the primary machine.

In some examples, one or more diff FMD files 502 are used as training data by a first machine learning system that may include a feature vectorization module 506 and an anomaly machine-learning (ML) model 508 to generate an anomaly prediction 510. The generated anomaly prediction 510 is communicated at 512 to a front-end web user interface 526 of a SaaS platform (for example, as described above). In some examples, the components illustrated in the anomaly and ransomware detection pipeline 500 operate only on snapshot metadata and not production data or infrastructure, and hence have minimal effect (if any) on a production system.

Furthermore, in some examples, instead of running the workflow pipeline 500 on the data backup system, the data backup system uploads the diff FMD files 502 to the SaaS platform to be processed by a pipeline residing in the cloud. In this arrangement, not only is there minimal impact on primary machine production, but very limited impact on the performance of associated backup and recovery jobs.

In the illustrated workflow pipeline example, if a filesystem anomaly is detected by the first machine learning system, a request 514 is made to the data backup system to initiate a second stage of the workflow pipeline 500. During this second stage, the data backup system performs an entropy scan 516 for all files that have changed on the primary machine since the last snapshot was taken. The results are saved to a file (for example, a ransomware SSTable 518). The file is then uploaded to the SaaS platform for further processing by a second machine learning system. The second machine learning system includes a feature vectorization module 520 and an encryption model 522 trained to predict ransomware encryption events. The second machine learning system accesses and processes the SSTable 518 in the file to determine whether a ransomware infection event has occurred on the primary machine. An encryption prediction 524 is communicated at 528 to the web front-end of the SaaS platform 526.

By adopting a two-stage analysis architecture that ingests and processes snapshot metadata for anomaly and ransomware detection, the ransomware detection pipeline 500 can scale up with ease, even for a cluster containing hundreds of thousands of primary machines. In some examples, as discussed, the components in the anomaly and ransomware detection pipeline 500 include two machine-learning models. The anomaly detection model 508 may be implemented using a deep neural network (DNN), and the encryption detection model 522 may be implemented using a logistic regression model (LRM).

In some examples, both machine learning models 508 and 522 are trained using supervised learning, which may include presenting labelled data to the machine learning models as training data. Sufficient and appropriate labelled data is typically keenly sought as a key aspect of accurate training and may be especially significant for real-world applications. In order to train a well-calibrated model, it may be desirable to build a well-balanced labelled dataset that consists of a roughly equal proportion of data points corresponding to "normal" filesystem behavior and data points corresponding to "anomalous" and/or ransomware "encryption" activity.

Although the existence of ransomware presents an ever-increasing threat, the collection of the requisite labelled data may be difficult as the occurrence of ransomware encryption in a snapshot is statistically rare in a production environment. This renders a production environment an unreliable source for collecting data points corresponding to ransomware events. In order to address this short-coming in the data sourcing process, some examples herein include or are based on a FMAT. A FMAT addresses data scarcity problems and can enable the building of significantly more complex machine learning models.

In some examples, a FMAT operates by repeatedly sampling metadata files from a seed corpus and merging them according to a pre-defined heuristic. The merging process "simulates" ransomware activity for a given snapshot, without the expensive overhead of actually setting up a machine to run ransomware infection experiments. This technique is highly scalable and can be applied across millions of snapshots to generate sufficient data to train the machine learning models 508 and 522 in example ransomware detection systems. In some FMAT examples, it is possible to synthesize a well-balanced dataset containing millions of data points from both positive and negative classes for machine learning. Moreover, the creation of such datasets can take place in a matter of hours rather than weeks or months as is typically the case for most data collection processes.

A typical scenario for a system infected with ransomware may begin with a user accidently downloading ransomware onto their filesystem. The user may accidentally or unknowingly execute malware masked as a harmless PDF document in an email attachment, for example. The ransomware then quickly encrypts a large number of documents in the user's filesystem with the decryption key hidden to the user. In most instances, the user will not know that they have been infected with ransomware until they attempt to open an encrypted file. Given the static nature of most filesystems, it is quite possible for ransomware to remain undiscovered for a significant period of time. This observation is also indicative of the fact that when a ransomware infection does occur, the event may be characterized by a sudden burst of activity in terms of the absolute number of files in the system that are created, deleted, and modified.

Figure 6:
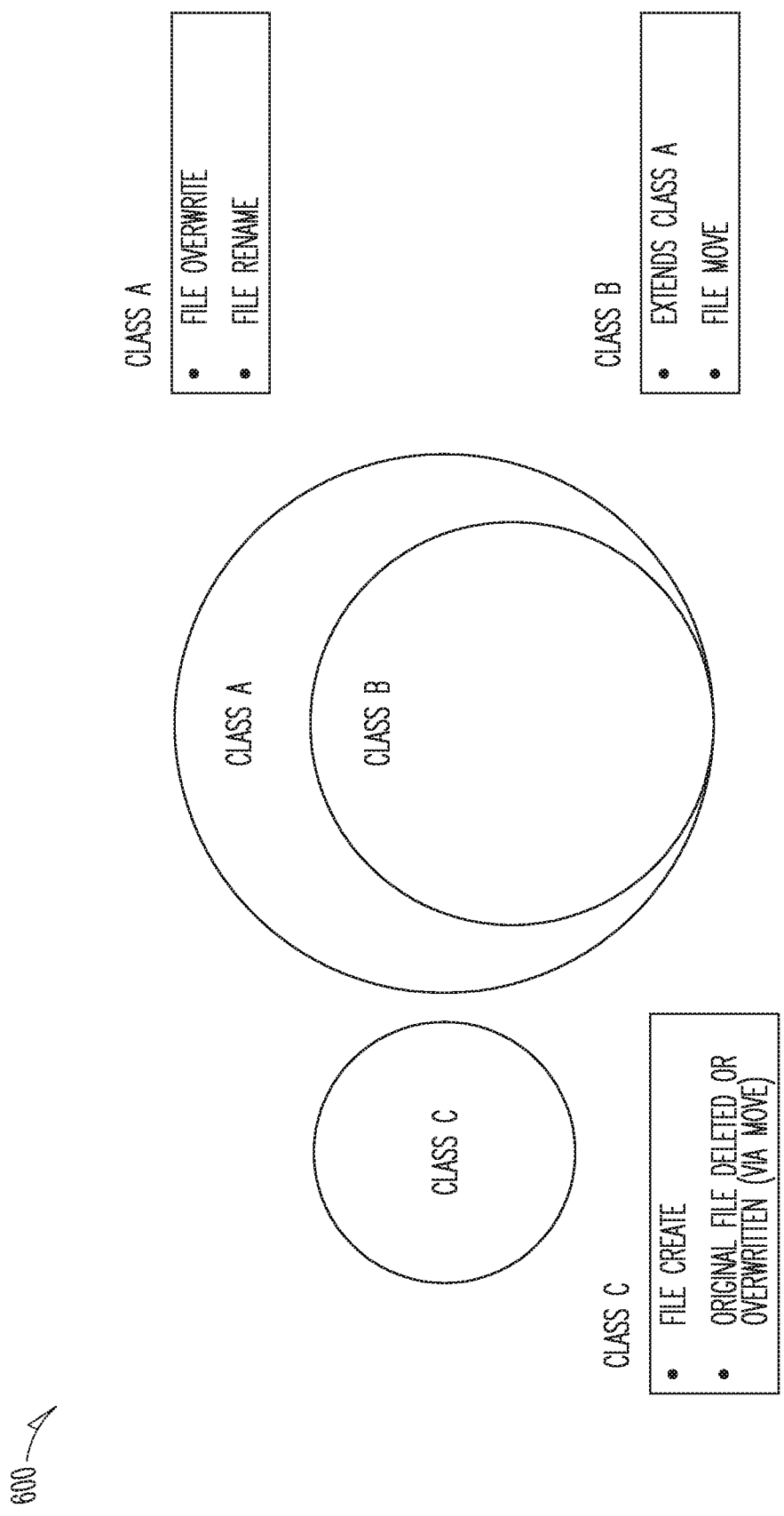
FIG. 6 depicts a ransomware classification, according to an example embodiment.

With reference to FIG. 6, it may be useful in this regard to categorize certain classes of ransomware to gain a deeper understanding of aspects of the present disclosure. A conceptual description for each of these example classes is provided according to the classification 600 shown in the view. Class A ransomware overwrites the content of a file via encryption, with a possible renaming of the file. Class B ransomware extends Class A and moves files out of a user directory to a temporary directory, encrypts the files in the temporary directory, then moves them back. The file name may be changed during the move. Class C ransomware creates a new, independent, encrypted file. The original file is deleted or overwritten. It may be noted that each of these ransomware classes may share a high degree of overlap in terms of ransomware behavior. An example situation might include ransomware which both encrypts files by overwriting them and encrypts files by creating new ones and deleting the original file. Some example anomaly and ransomware detection pipelines may include a goal of being able to detect all three ransomware classes both independently and jointly.

To this end, certain factors may be utilized in anomaly and ransomware detection based on machine learning. A first factor may include an observation that most directories in a filesystem remain static over time, marked by sudden periods of high activity. Given that ransomware tends to run relatively quickly across a short period of time, it may be sufficient to simply examine the entropy changes of the files modified in a filesystem in order to detect an infection. This factor may improve scalability significantly, since it allows a ransomware detection pipeline to examine only the partial contents of a filesystem for ransomware.

A second factor may include an observation that ransomware encryption in a snapshot is a statistically rare event. In particular, the majority of snapshots will consist of little to no changes to the underlying machine being backed up. Thus, it is possible to make significant savings in computational processing by scanning only for ransomware on filesystems that show a non-trivial likelihood of being infected.

With reference to FIG. 7, these factors allow the configuration or categorization 700 of an anomaly and ransomware detection pipeline comprising two stages. A first stage, which may be referred to as a Filesystem Behavior Analysis stage, includes a computationally "cheap" scan of filesystem metadata to detect and identify a first set of anomalous snapshot changes 702. A second stage, which may be referred to as a Filesystem Content Analysis stage, includes a relatively more expensive scan of the actual filesystem contents to detect and identify a second set 704 of malicious encryption events. An intersection of sets 702 and 704 may include a prediction set 706 of likely ransomware infection events that may be further investigated. By adopting a two-stage anomaly-encryption detection architecture for anomaly and ransomware detection, an example detection pipeline can be built to scale across millions of machines.

An example first stage (Filesystem Behavior Analysis) performs a preliminary analysis for anomalous events by examining the changes in the filesystem since a previous snapshot, typically the last snapshot. This stage is initiated by the upload of a diff ENID file from a data backup system as discussed above. The diff FMD file is a metadata file that lists the files that have changed in a filesystem since the last snapshot. These diff FMD files tend to be relatively small and are about 1 or 2 kilobytes in size when represented in a binary encoding. An example of some filesystem metadata 800 in a diff FMD file is shown in human-readable format in FIG. 8.

The diff FMD file may be uploaded to a SaaS platform (for example, as described above), where it is used, for example, by the first machine learning system to predict for anomalies. In one example, a detection of a large number of files being added to or moved around a directory may be indicative of an anomaly such as a malware or ransomware infection. The computation carried out during this stage is relatively lightweight and highly scalable since it is primarily ingesting the file change statistics since the last snapshot, rather than the full snapshot itself. Thus the necessary data processing to predict anomalies is very fast.

In the course of taking a snapshot on a primary machine, for example, taken by a data backup system, the system mounts that snapshot and crawls the filesystem of the mounted machine. MD is generated during the crawling step and the metadata file specifies the structure of the filesystem along with a set of metadata attributes for each file within it (such as the file path or file size).

As discussed above more generally, once the FMD file has been generated, it is compared with the FMD file from the previous snapshot to compute a diff FMD file, for example diff FMD file 502 in FIG. 5. This diff FMD 502 contains a list of entries corresponding to files that have been created, deleted, or modified, and may include a complete log of the file changes that have taken place on the backup. The diff FMDs (as opposed to conventional FMDs) are ingested by the first machine learning system (for example, modules or models 506 and 508) to produce an initial anomaly prediction 510. By modelling the anomaly detection problem using a deep neural network, the system is able to make highly accurate predictions on whether an anomalous event has occurred in a new snapshot. A high level of accuracy may be crucial during this first stage (Filesystem Behavior Analysis), since the subsequent encryption detection stage (Filesystem Content Analysis) is only triggered when an anomaly is detected during the first stage. Thus, in some examples, it is important that the anomaly and ransomware detection pipeline 500 is capable of flagging any suspicious changes that may have been made by a bad actor.

One benefit of using a deep learning approach for anomaly detection is that the neural network model is capable of learning its own set of features when given the raw features from the data. This reduces the need for expensive hand-engineering of the features by an engineer or scientist. Thus, in some examples, certain feature vectors exposed to the deep learning model may include many raw statistics computed from a diff FMD file. Some examples of these statistics may include: file operation statistics such as the number of files created, deleted, and modified since the last snapshot, user activity metrics corresponding to files that have been changed by the user, system activity metrics corresponding to files that have been changed by the operating system or software running on the machine, and suspicious activity metrics corresponding to the number of files with suspicious names.

During training, the neural network learns a set of high-level features built on top of these low-level features to internally represent the snapshot changes. For example, the neural network may be able to infer that a ransomware encryption event has occurred from the fact that a large number of office documents has been modified or deleted in the system. These high-level features learned by the neural network enables it to ultimately predict what type of activity has occurred on the primary machine and whether this activity warrants an anomaly alert.

The second stage (Filesystem Content Analysis) is primarily responsible for detecting encryption activity made by ransomware and is initiated when an anomaly is detected by the anomaly detection model during filesystem behavior analysis. File encryption by ransomware tends to be characterized by a sharp increase in file entropy. Some examples detect whether a malicious encryption event has occurred by computing an entropy value for files that have changed since the last snapshot and evaluating these entropy readings using a machine learning model. Although analyzing the entropy of the file content may be effective towards detecting encryption activity, this is also a computationally expensive procedure that requires reading the binary contents of a file. Thus, in some examples, this stage is only triggered in the event of an anomaly alert raised by the initial anomaly detection stage.

In this regard, aspects of computing a ransomware SSTable for a file entropy are now described. When an anomaly is detected by a machine learning model, running on a SaaS platform, for example, a request is made to the data backup system to initiate the second stage of the ransomware detection pipeline. During this second stage, the data backup system performs an entropy scan for all the files that have changed on the primary machine since the last snapshot. The computed file entropy values are stored in a ransomware SSTable (RST) file (for example, ransomware SSTable 518 of FIG. 5), which is uploaded to the SaaS platform to be processed by a ransomware (encryption) detection pipeline (assuming that an anomaly was detected during the first stage). The ransomware (encryption) detection pipeline may include modules or models 520 and 522 of FIG. 5. An example RST file may contain entropy values for files that have been added or modified since the last snapshot was taken. Entropy values may be computed by calculating a Shannon entropy for the first 512 bytes (or more generally some number (N)) of the file. Example ransomware SStable content 900 of an RST file is shown in FIG. 9.

Once the RST file has been uploaded, it is processed by the ransomware detection pipeline to predict whether a ransomware encryption event occurred on the primary machine. The ransomware detection pipeline will ingest the RST file to compute a set of features corresponding to entropy values on various sets of files on the primary machine. These features are then fed into the encryption detection model (for example, the encryption detection model 522 of FIG. 5) to identify encryption activity. In some examples, the encryption detection model is also implemented using machine learning similar to the anomaly detection model. The underlying implementation uses LRM. The LRM is favored for its simplicity and scalability and is robust against noise in the data. The encryption detection model may be trained using supervised learning similar to the anomaly detection model.

Example features for predicting ransomware encryption events are now described. A set of features used for encryption detection (for example, set 704) may be relatively small when compared with a set of features used for anomaly detection (for example, set 702). Generally speaking, features of interest for encryption detection include: entropy statistics corresponding to the change in entropy levels detected in the backup, file operation statistics such as the number of files created and modified since the last snapshot, and suspicious activity metrics corresponding to the number of files with suspicious naming patterns. These features may assist in determining whether a malicious encryption event has occurred on the primary machine. These basic statistics do not require additional feature engineering, since they are already highly correlated with the encryption signal. Consequently, a Logistic Regression model works effectively for encryption detection when given these features.

As mentioned above, the collection of "real" labelled data for machine learning may be time intensive and difficult. Use cases for labelled data may be two-fold: first, labelled data provides a learning input for a model during training and, second, provides a measure of the expected accuracy in production during testing. Without labelled data, the challenge of developing an effective machine learning model is high. Moreover, the volume and type of labelled data collected should account for the complexity of the machine learning problem.

Some examples herein obtain labelled data "artificially" by simulating the existence of ransomware within a development machine such as a virtual machine (VM). But some simulation approaches may nevertheless remain costly and not scale well for reasons that may include the following. Many ransomware samples sourced from the Internet, for example, are "dead-on-arrival" and will not run within a simulation environment. Moreover, ransomware behavior is sporadic and unpredictable. Running a sample of live ransomware is in itself a challenging task. The behavior of ransomware is unpredictable and the results from running ransomware varies from simulation to simulation. On some occasions, the ransomware will run within minutes and encrypt a whole host of directories on files. Yet on other occasions, it may remain static for long periods of time and only encrypt a small number of files. Further, a prototypical customer machine filesystem (i.e., susceptible or capable of having a snapshot taken of it or portions of it) should be simulated to an appropriate degree of accuracy. Attempting to simulate such an environment is technically complex given the wide range of possible machine environments that may exist in an array of clusters, for example. Some users could be using a machine as an email exchange server, whereas other users could be using their machines for running software builds. It is costly in terms of both computational resources and development time to build a simulation engine that will sufficiently capture all the variations of machine environments that may be desirable for machine learning.

For these reasons, simulating ransomware is typically a costly effort, which may unduly limit the number of data points that can be gathered. Some examples herein include or are based on an alternative approach that is more cost-effective in terms of compute and development time. The approach may include data augmentation using snapshot metadata.

Figure 10:
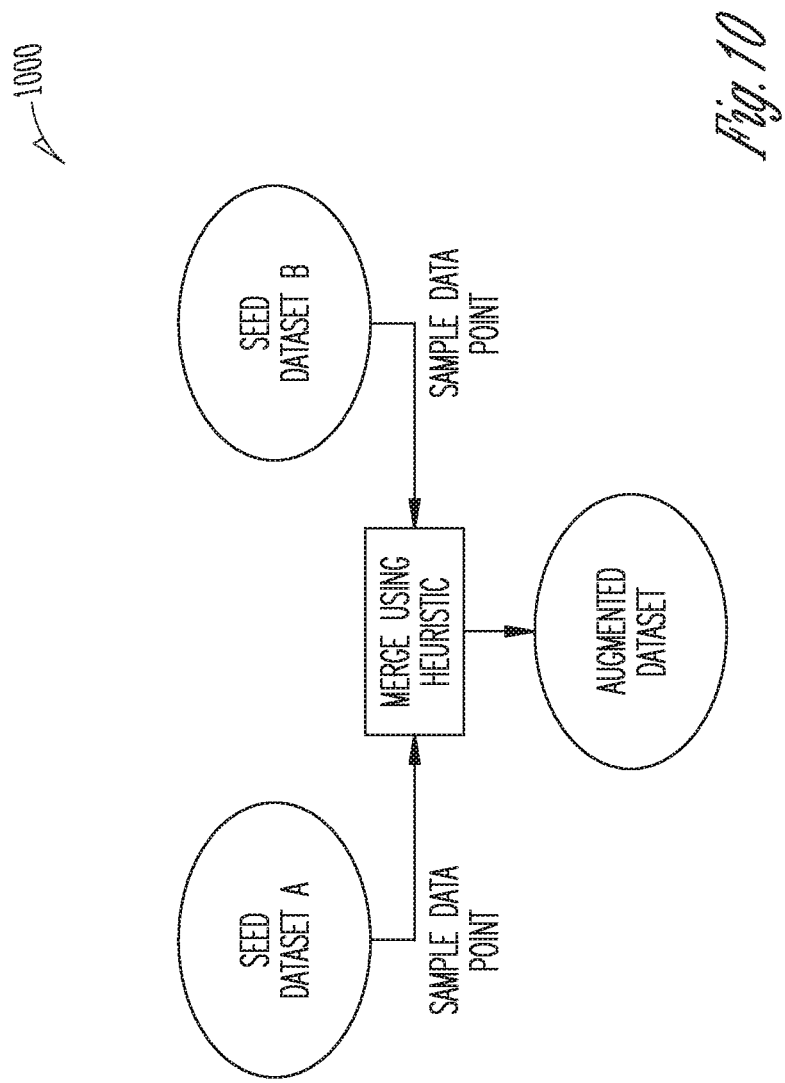
FIG. 10 depicts a flow chart showing operations in a training data augmentation method, according to an example embodiment.

Data augmentation may provide a convenient alternative to gathering data compared with more expensive approaches such as real or certain simulation techniques. FIG. 10 depicts a high-level flow chart for training data augmentation in FMAT. When using FMAT to generate more ransomware infection data points, the seed dataset A will consist of "normal" data points, whereas the seed dataset B will consist of data points corresponding to ransomware "infections." Metadata augmentation techniques as part of FMAT can generate appropriately accurate and useful quantities of labelled training data. This may allow the creation of significantly more complex machine learning models that materially improve the accuracy of a ransomware or encryption detection pipeline.

Some example data augmentation examples may include or be based on certain preconditions. A first example precondition may include the existence of a seed dataset containing "normal" filesystem metadata. This may be needed to provide the initial negative samples for performing data augmentation. A second precondition may include access to prototype data examples of a desired positive class. A prototype example may serve as a seed data point for constructing the desired positive dataset. In the case of a SaaS platform, this example might correspond to a snapshot metadata file containing the changes made by a ransomware program.

Further, certain assumptions may be made in some examples of data augmentation in FMAT. These may be satisfied during an initial data collection procedure. For example, hundreds of thousands of data points may be processed on a weekly basis, with almost all of these data points corresponding to normal user filesystem activity that occurs on a regular basis. Thus, there exists a large volume of seed data points for constructing a target normal dataset.

Figure 11:
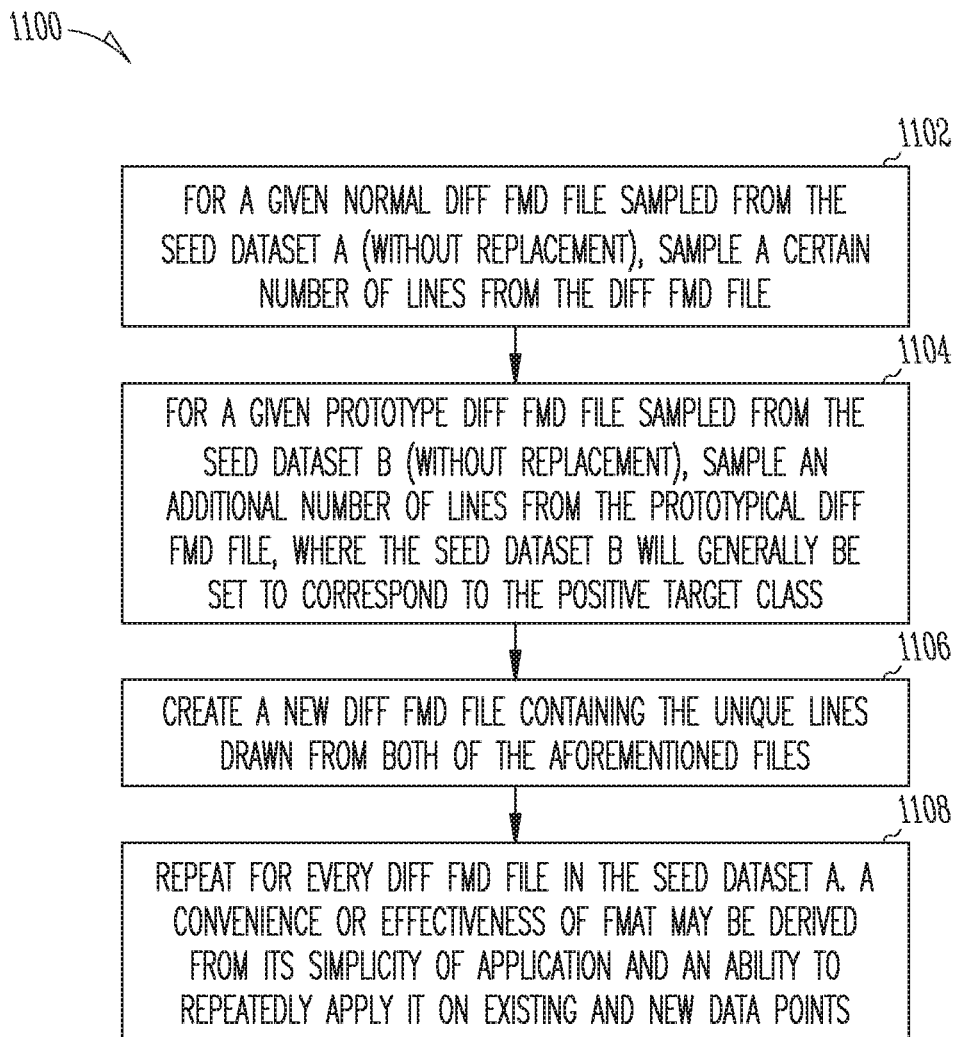
FIG. 11 depicts an example application of MAT to generate training data, according to an example embodiment.

With reference to FIG. 11, an example application 1100 of FMAT to generate training data for an anomaly detection model may include the following operations. At operation 1102, for a given normal diff FMD file sampled from the seed dataset A (without replacement), sample a certain number of lines from the diff FMD file. At operation 1104, for a given prototype diff FMD file sampled from the seed dataset B (without replacement), sample an additional number of lines from the prototypical diff FMD file, where the seed dataset B will generally be set to correspond to the positive target class. At operation 1106, create a new diff FMD file containing the unique lines drawn from both of the aforementioned files. At operation 1108, repeat for every diff FMD file in the seed dataset A. A convenience or effectiveness of FMAT may be derived from its simplicity of application and an ability to repeatedly apply it on existing and new data points.

Benefits of this FMAT approach include the creation of well-balanced datasets. Datasets created using FMAT will typically contain a well-proportioned mixture of data examples from both the positive and negative classes (i.e., diff MID files). A diversified collection of diff FMD files containing changes from the prototype diff FMD is created. This enables a machine learning model to observe filesystem changes contained in the prototype diff FMD under the context of a wide variety of snapshot changes. For example, if the prototype diff FMD contained filesystem changes from a ransomware infection, FMAT will ensure that these filesystem changes are observed by the machine learning model alongside many other types of "normal" filesystem changes. This helps to improve the model's ability to recognize ransomware behavior in a real-world environment.

In some examples, the application of FMAT will cause the dataset to double in size. From an empirical standpoint, some examples apply a data pruning procedure after applying FMAT to remove noisy data points. One example of an effective pruning procedure is to remove any augmented data point that is similar to data points in the seed datasets by using a data similarity metric.

In some examples, it is also possible to apply EVENT on a dataset already augmented by FMAT. This may be desirable in cases where a very large dataset is needed to effectively train and test a model. Although repeated applications of FMAT can grow the dataset at an exponential rate, it can also introduce a significant source of noise in the data due to the signal amplification effects of FMAT. Careful empirical testing and tuning is necessary when using FMAT in this setting.

Thus, in some examples, anomaly and ransomware detection is implemented using a two-stage anomaly-encryption detection pipeline. A ransomware detection system can be built to scale infinitely by utilizing the snapshot metadata inherently generated by a backup system for a primary machine.

Both the anomaly and encryption detection models may be implemented using machine learning methods. In some examples, the implementation for the anomaly detection model utilizes deep learning approaches and is based on a deep neural network trained using supervised learning. A deep neural network is capable of learning very sophisticated internal representations built on top of raw representations for snapshot metadata. This internal representation allows the model to make far more accurate anomaly predictions. In some examples, the encryption detection model is implemented using a Logistic Regression model and is similarly trained using supervised learning. Together, these two models form the backbone of a machine learning pipeline in a ransomware detection pipeline and may be used in conjunction towards anomaly and ransomware detection on snapshot metadata in a ransomware detection system.

Figure 12:
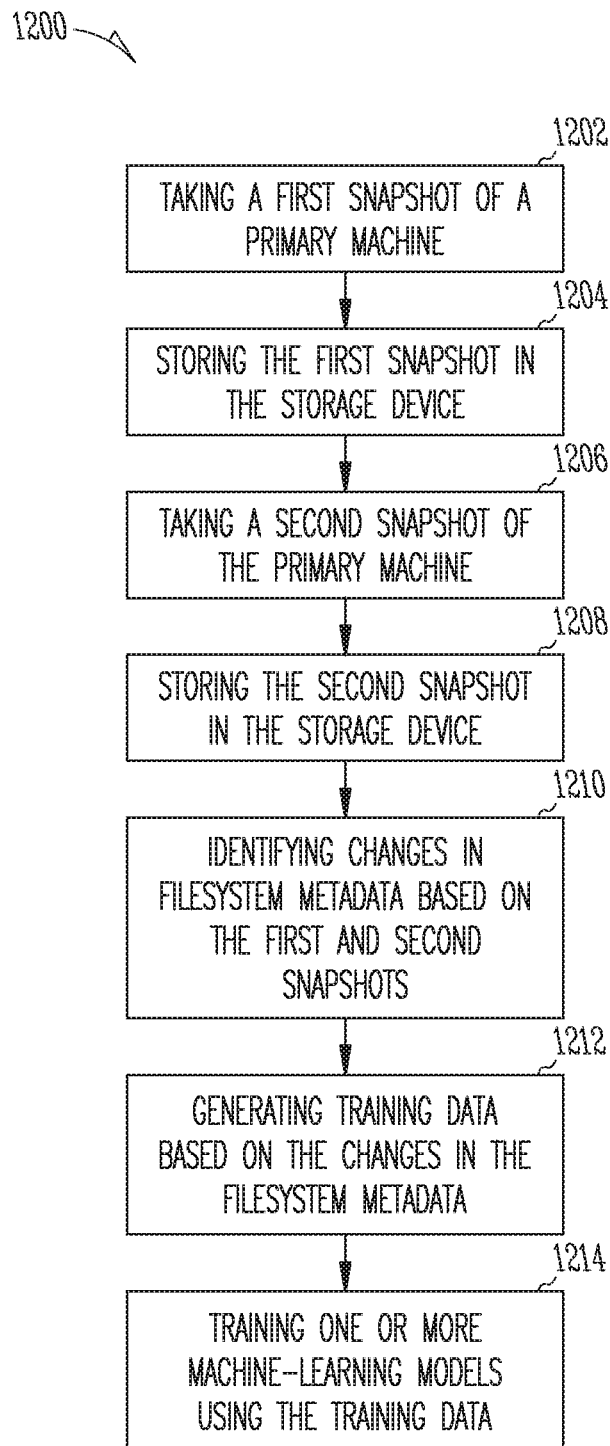
FIGS. 12-14 each depict a block flow chart indicating example operations in a method of the present disclosure, according to an example embodiment.

Thus, some embodiments of the present disclosure include methods. With reference to FIG. 12, an example method 1200 may be performed at an anomaly and detection system, the system including one or more processors in communication with a storage device and a production system, the one or more processors configured to perform anomaly and ransomware operations including, at least: at operation 1202, taking a first snapshot of a primary machine; at operation 1204, storing the first snapshot in the storage device; at operation 1206, taking a second snapshot of the primary machine; at operation 1208, storing the second snapshot in the storage device; at operation 1210, identifying changes in filesystem metadata based on the first and second snapshots; at operation 1212, generating training data based on the changes in the filesystem metadata; and, at operation 1214, training one or more machine-learning models using the training data.

In some examples, the storage device is a backup storage device and the identified changes are sourced from a backup system that includes the backup storage device. In some examples, the anomaly and ransomware detection operations are performed without impacting the production system. In some examples, at least some of the anomaly and ransomware detection operations are offloaded to a cloud-based SaaS platform. In some examples, the one or more machine-learning models include an anomaly model and/or an encryption model. In some examples, the training of the one or more machine-learning models is based on training data derived solely on the snapshot-based metadata.

Figure 13:
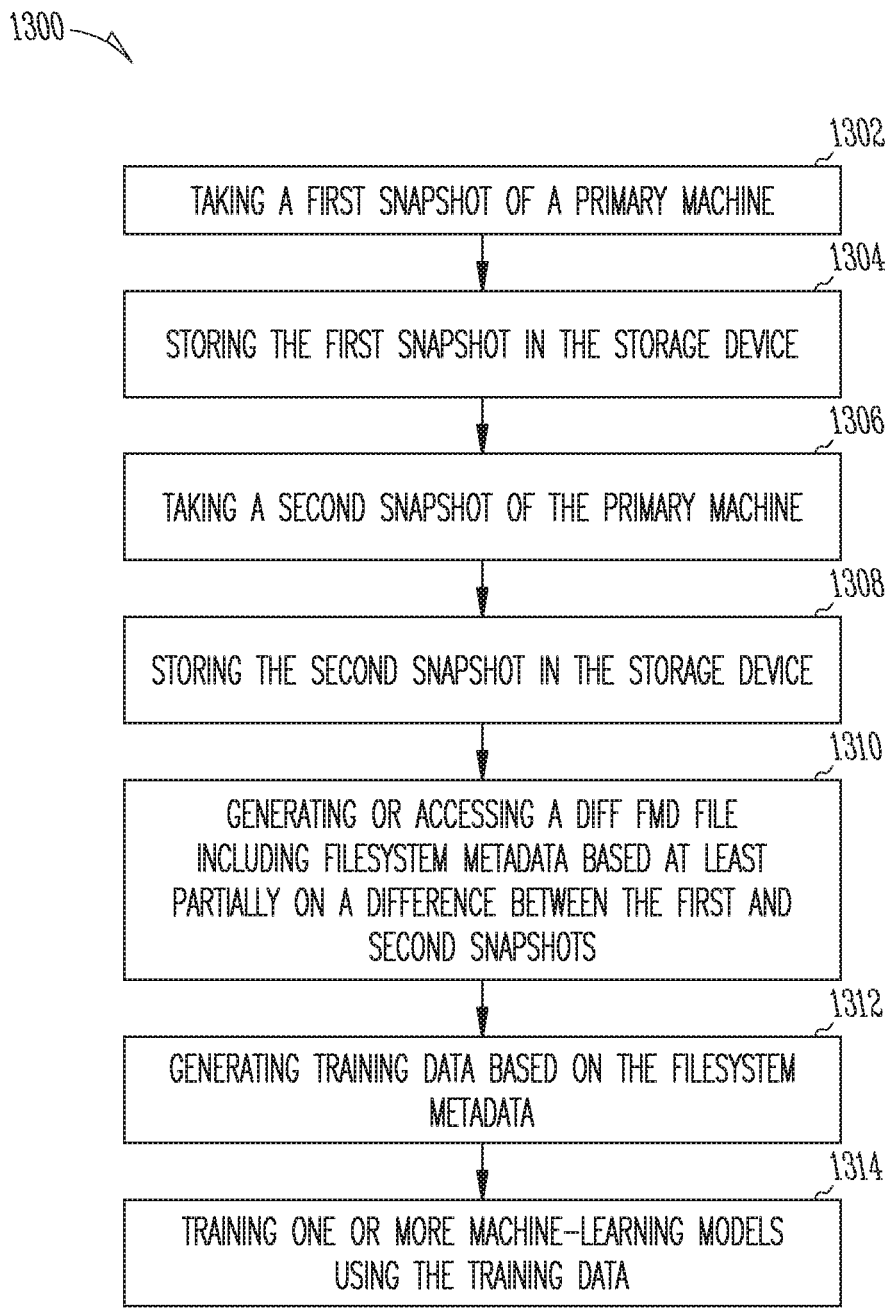

With reference to FIG. 13, an example method 1300 may be performed at an anomaly and detection system, the system including one or more processors in communication with a storage device and a production system, the one or more processors configured to perform anomaly and ransomware detection operations including, at least: at operation 1302, taking a first snapshot of a primary machine; at operation 1304, storing the first snapshot in the storage device; at operation 1306, taking a second snapshot of the primary machine; at operation 1308, storing the second snapshot in the storage device; at operation 1310, generating or accessing a diff FMD file including filesystem metadata based at least partially on a difference between the first and second snapshots; at operation 1312, generating training data based on the filesystem metadata; and, at operation, 1314, training one or more machine-learning models using the training data.

In some examples, the storage device is a backup storage device and the generated or accessed metadata is received from a backup system that includes the backup storage device. In some examples, the anomaly and ransomware detection operations are performed without impacting the production system. In some examples, at least some of the anomaly and ransomware detection operations are offloaded to a cloud-based SaaS platform. In some examples, the one or more machine-learning models includes an anomaly model and/or an encryption model. In some examples, the training of the one or more machine-learning models is based on training data derived solely on the snapshot-based metadata.

Figure 14:
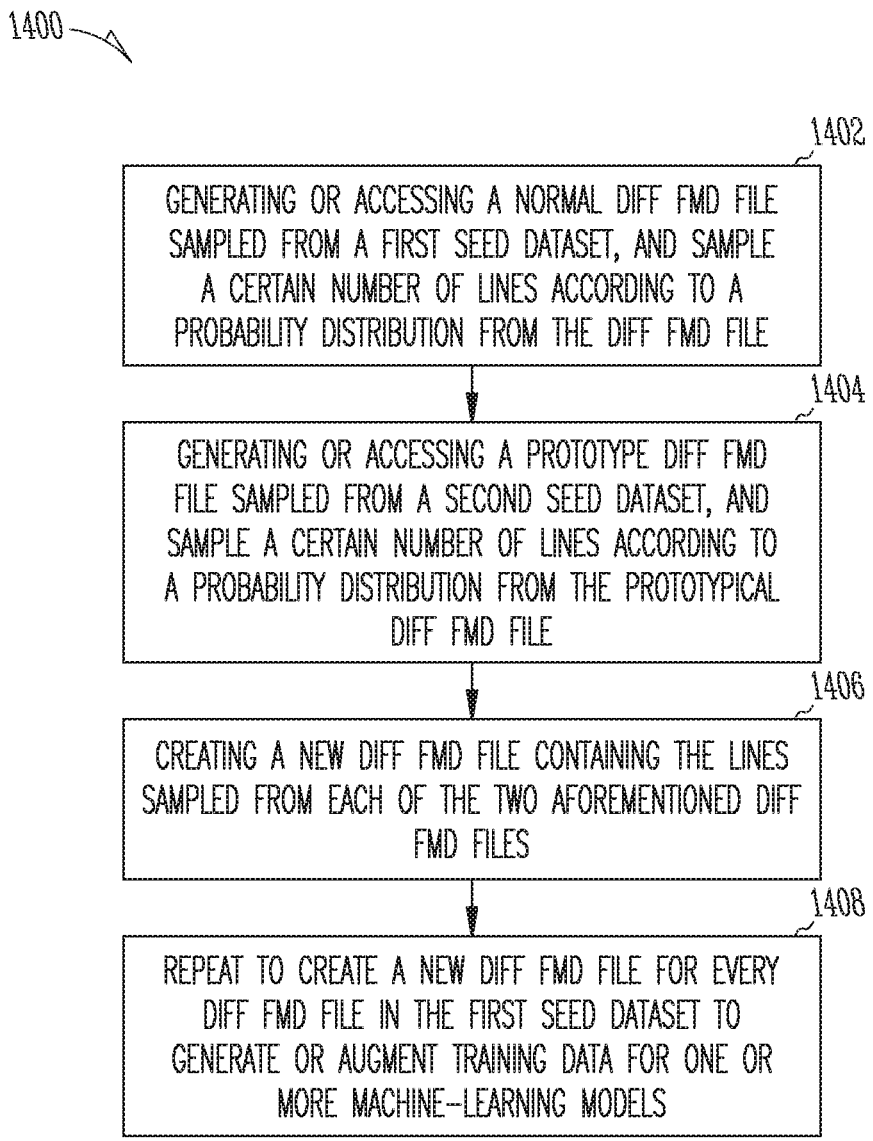

With reference to FIG. 14, an example method 1400 may be performed by an FMAT system, the FMAT system including one or more processors configured to training data augmentation operations including, at least: at operation 1402, generating or accessing a normal diff FMD file sampled from a first seed dataset and sampling a certain number of lines according to a probability distribution from the diff FMD file; at operation 1404, generating or accessing a prototype diff FMD file sampled from a second seed dataset and sampling a certain number of lines according to a probability distribution from the prototypical diff FMD file; at operation 1406, creating a new diff FMD file containing the lines sampled from each of the two aforementioned diff FMD files; and, at operation 1408, repeating to create a new diff FMD file for every diff FMD file in the first seed dataset to generate or augment training data for one or more machine-learning models.

In some examples, the first seed dataset corresponds to a negative target class. In some examples, the second dataset corresponds to a positive target class. In some examples, the training data augmentation operations are performed by a backup system without impacting production operations in a production system served by the backup system. In some examples, at least some of the training data augmentation operations are offloaded by the FMAT system to a cloud-based computing platform. In some examples, the one or more machine-learning models includes an anomaly model and/or an encryption model.

Figure 15:
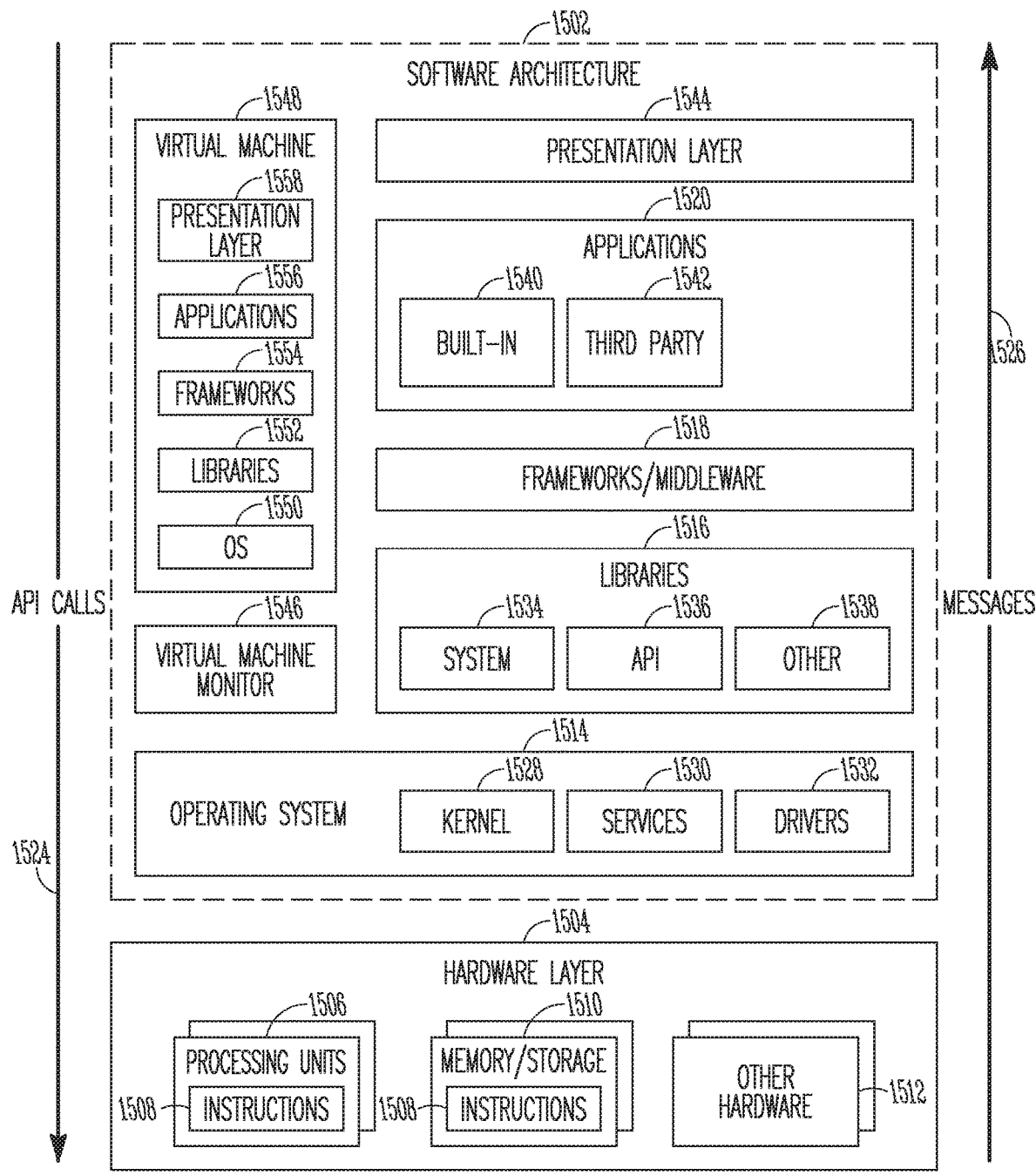
FIG. 15 depicts a block diagram illustrating an example of a software architecture that may be installed on a machine, according to some example embodiments.

FIG. 15 is a block diagram illustrating an example of a computer software architecture for data classification and information security that may be installed on a machine, according to some example embodiments. FIG. 15 is merely a non-limiting example of a software architecture, and it will be appreciated that many other architectures may be implemented to facilitate the functionality described herein. The software architecture 1502 may be executing on hardware such as a machine 1600 of FIG. 16 that includes, among other things, processors 1110, memory 1130, and I/O components 1150. A representative hardware layer 1504 of FIG. 15 is illustrated and can represent, for example, the machine 1700 of FIG. 17. The representative hardware layer 1504 of FIG. 15 comprises one or more processing units 1506 having associated executable instructions 1508. The executable instructions 1508 represent the executable instructions of the software architecture 1502, including implementation of the methods, modules, and so forth described herein. The hardware layer 1504 also includes memory or storage modules 1510, which also have the executable instructions 1508. The hardware layer 1504 may also comprise other hardware 1512, which represents any other hardware of the hardware layer 1504, such as the other hardware illustrated as part of the machine 1500.

In the example architecture of FIG. 15, the software architecture 1502 may be conceptualized as a stack of layers, where each layer provides particular functionality. For example, the software architecture 1502 may include layers such as an operating system 1514, libraries 1516, frameworks/middleware 1518, applications 1520, and a presentation layer 1544. Operationally, the applications 1520 or other components within the layers may invoke API calls 1524 through the software stack and receive a response, returned values, and so forth (illustrated as messages 1526) in response to the API calls 1524. The layers illustrated are representative in nature, and not all software architectures have all layers. For example, some mobile or special purpose operating systems may not provide a frameworks/middleware 1518 layer, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 may provide a common infrastructure that may be utilized by the applications 1520 and/or other components and/or layers. The libraries 1516 typically provide functionality that allows other software modules to perform tasks in an easier fashion than by interfacing directly with the underlying operating system 1514 functionality (e.g., kernel 1528, services 1530, or drivers 1532). The libraries 1516 may include system libraries 1534 (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media formats such as MPEG4, H.264, MP3, AAC, AMR, SPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) may provide a higher-level common infrastructure that may be utilized by the applications 1520 or other software components/modules. For example, the frameworks 1518 may provide various GUI functions, high-level resource management, high-level location services, and so forth. The frameworks 1518 may provide a broad spectrum of other APIs that may be utilized by the applications 1520 and/or other software components/modules, some of which may be specific to a particular operating system or platform.

The applications 1520 include built-in applications 1540 and/or third-party applications 1542. Examples of representative built-in applications 1540 may include, but are not limited to, a home application, a contacts application, a browser application, a book reader application, a location application, a media application, a messaging application, or a game application.

The third-party applications 1542 may include any of the built-in applications 1540, as well as a broad assortment of other applications. In a specific example, the third-party applications 1542 (e.g., an application developed using the Android™ iOS™ software development kit (SDK) by an entity other than the vendor of the particular platform) may be mobile software running on a mobile operating system such as iOS™, Android™, Windows® Phone, or other mobile operating systems. In this example, the third-party applications 1542 may invoke the API calls 1524 provided by the mobile operating system such as the operating system 1514 to facilitate functionality described herein.

The applications 1520 may utilize built-in operating system functions (e.g., kernel 1528, services 1530, or drivers 1532), libraries (e.g., system 1534, APIs 1536, and other libraries 1538), or frameworks/middleware 1518 to create user interfaces to interact with users of the system. Alternatively, or additionally, in some systems, interactions with a user may occur through a presentation layer, such as the presentation layer 1544. In these systems, the application/module "logic" can be separated from the aspects of the application/module that interact with the user.

Some software architectures utilize virtual machines. In the example of FIG. 15, this is illustrated by a virtual machine 1548. A virtual machine creates a software environment where applications/modules can execute as if they were executing on a hardware machine e.g., the machine 1700 of FIG. 17, for example). A virtual machine 1548 is hosted by a host operating system (e.g., operating system 1514) and typically, although not always, has a virtual machine monitor 1546, which manages the operation of the virtual machine 1548 as well as the interface with the host operating system (e.g., operating system 1514). A software architecture executes within the virtual machine 1548, such as an operating system 1550, libraries 1552, frameworks/middleware 1554, applications 1556, or a presentation layer 1558. These layers of software architecture executing within the virtual machine 1548 can be the same as corresponding layers previously described or may be different.

Figure 16:
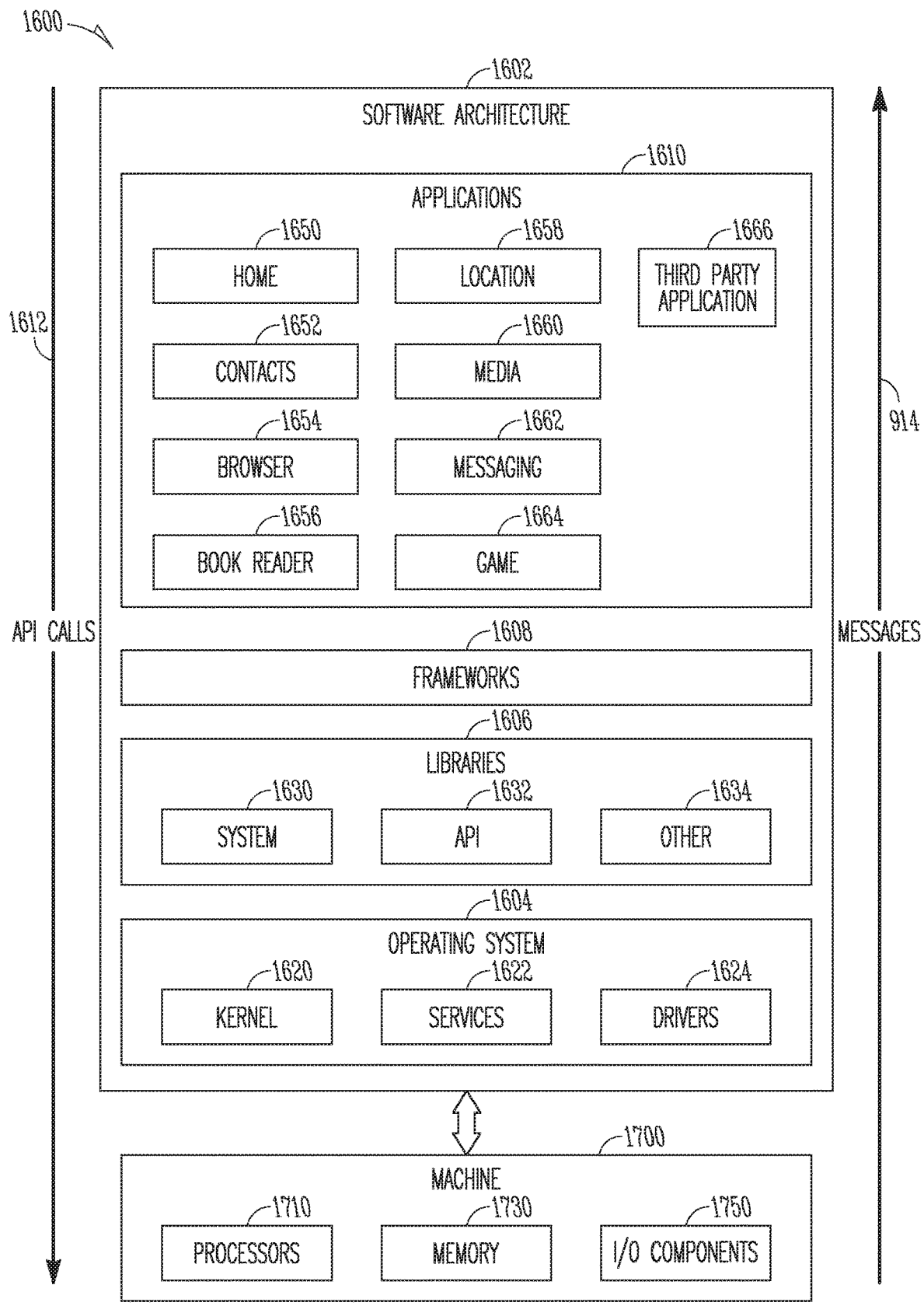
FIG. 16 depicts a block diagram 1600 illustrating an architecture of software 1602, according to an example embodiment.

FIG. 16 is a block diagram 1600 illustrating an architecture of software 1602, which can be installed on any one or more of the devices described above. FIG. 16 is merely a non-limiting example of a software architecture, and it will be appreciated that many other architectures can be implemented to facilitate the functionality described herein. In various embodiments, the software 1602 is implemented by hardware such as a machine 1700 of FIG. 17 that includes processors 1110, memory 1130, and I/O components 1150. In this example architecture, the software 1602 can be conceptualized as a stack of layers where each layer may provide a particular functionality. For example, the software 1602 includes layers such as an operating system 1604, libraries 1606, frameworks 1608, and applications 1610. Operationally, the applications 1610 invoke API calls 1612 through the software stack and receive messages 1614 in response to the API calls 1612, consistent with some embodiments.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers, consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as MPEG4, Advanced Video Coding (H.264 or AVC), MP3, AAC, AMR audio codec, PEG or JPG, or PNG), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various GUI functions, high-level resource management, high-level location services, and so forth. The frameworks 1608 can provide a broad spectrum of other APIs that can be utilized by the applications 1610, some of which may be specific to a particular operating system or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications such as a third-party application 1666. According to some embodiments, the applications 1610 are programs that execute functions defined in the programs. Various programming languages can be employed to create one or more of the applications 1610, structured in a variety of manners, such as object-oriented programming languages Objective-C, Java, or C++) or procedural programming languages (e.g., C or assembly language). In a specific example, the third-party application 1666 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the third-party application 1666 can invoke the API calls 1610 provided by the operating system 1604 to facilitate functionality described herein.

Figure 17:
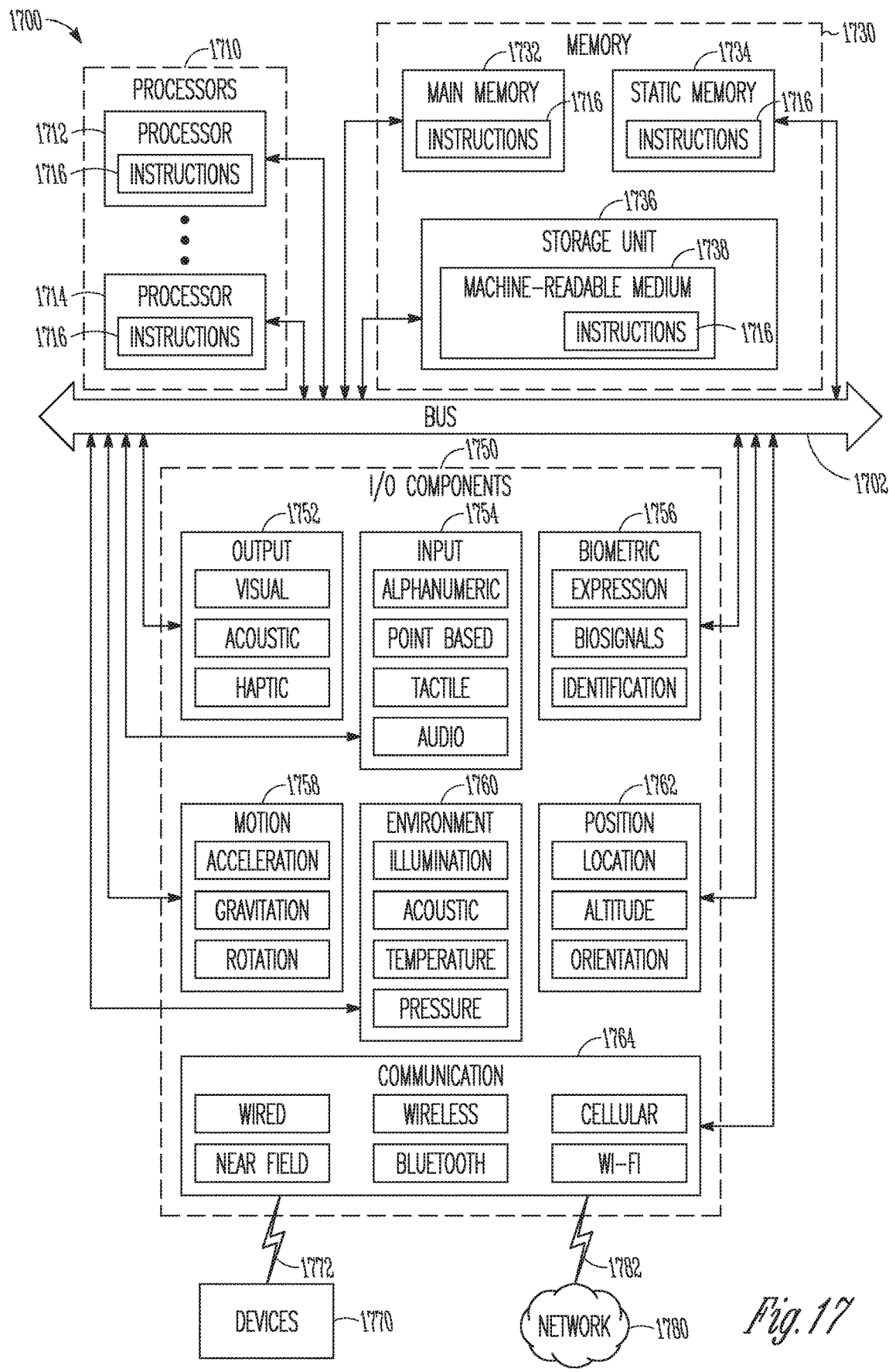
FIG. 17 illustrates a diagrammatic representation of a machine 1700 in the form of a computer system within which a set of instructions may be executed for causing a machine to perform any one or more of the methodologies discussed herein, according to an example embodiment.

FIG. 17 illustrates a diagrammatic representation of a machine 1700 in the form of a computer system within which a set of instructions may be executed for causing the machine to perform any one or more of the methodologies discussed herein, according to an example embodiment. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. Additionally, or alternatively, the instructions 1716 may implement the operations of the methods shown in FIGS. 12-14, or as elsewhere described herein.

The instructions 1716 transform the general, non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 may include processors 1710, memory 1730, and I/O components 1750, which may be configured to communicate with each other such as via a bus 1702. In an example embodiment, the processors 1710 (e.g., a CPU, a Reduced Instruction Set Computing (RISC) processor, a Complex Instruction Set Computing (CISC) processor, a GPU, a Digital Signal Processor (DSP), an ASIC, a Radio-Frequency Integrated Circuit (RFIC), another processor, or any suitable combination thereof) may include, for example, a processor 1712 and a processor 1714 that may execute the instructions 1716. The term "processor" is intended to include multi-core processors that may comprise two or more independent processors (sometimes referred to as "cores") that may execute instructions contemporaneously. Although FIG. 17 shows multiple processors 1710, the machine 1700 may include a single processor with a single core, a single processor with multiple cores (e.g., a multi-core processor), multiple processors with a single core, multiple processors with multiples cores, or any combination thereof.

The memory 1730 may include a main memory 1732, a static memory 1734, and a storage unit 1736, each accessible to the processors 1710 such as via the bus 1702. The main memory 1730, the static memory 1734, and storage unit 1736 store the instructions 1716 embodying any one or more of the methodologies or functions described herein. The instructions 1716 may also reside, completely or partially, within the main memory 1732, within the static memory 1734, within the storage unit 1736, within at least one of the processors 1710 (e.g., within the processor's cache memory), or any suitable combination thereof, during execution thereof by the machine 1700.

The I/O components 1750 may include a wide variety of components to receive input, provide output, produce output, transmit information, exchange information, capture measurements, and so on. The specific I/O components 1750 that are included in a particular machine will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion and the grouping is in no way limiting. In various example embodiments, the I/O components 1750 may include output components 1752 and input components 1754. The output components 1752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environmental components 1760, or position components 1762, among a wide array of other components. For example, the biometric components 1756 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1758 may include acceleration sensor components (e.g., accelerometer), gravitation sensor components, rotation sensor components (e.g., gyroscope), and so forth. The environmental components 1760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1762 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 may include a network interface component or another suitable device to interface with the network 1780. In further examples, the communication components 1764 may include wired communication components, wireless communication components, cellular communication components, Near Field Communication (NFC) components, Bluetooth® components (e.g., Bluetooth®Low Energy), Wi-Fi® components, and other communication components to provide communication via other modalities. The devices 1770 may be another machine or any of a wide variety of peripheral devices (e.g., a peripheral device coupled via a USB).

Moreover, the communication components 1764 may detect identifiers or include components operable to detect identifiers. For example, the communication components 1764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1764, such as location via IP geolocation, location via Wi-Fi® signal triangulation, location via detecting an NFC beacon signal that may indicate a particular location, and so forth.

The various memories (i.e., 1730, 1732, 1734, and/or memory of the processor(s) 1710) and/or storage unit 1736 may store one or more sets of instructions and data structures (e.g., software) embodying or utilized by any one or more of the methodologies or functions described herein. These instructions (e.g., the instructions 1716), when executed by processor(s) 1710, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., hypertext transfer protocol (HTTP)). Similarly, the instructions 1716 may be transmitted or received using a transmission medium via the coupling 1772 (e.g., a peer-to-peer coupling) to the devices 1770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1716 for execution by the machine 1700, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments, Combinations of the above embodiments, and other embodiments not specifically described herein, will be apparent to those of skill in the art upon reviewing the above description.

The invention claimed is:

1. A filesystem metadata augmentation technique (FMAT) system, comprising:
   a memory; and
   one or more processors configured to perform training data augmentation operations including, at least:
      generating or accessing a first file sampled from a first seed dataset associated with a negative target class, and sampling a first number of lines according to a first probability distribution from the first file, wherein the first file comprises a change between two consecutive snapshots of the first seed dataset;
      generating or accessing a second file sampled from a second seed dataset associated with a positive target class, and sampling a second number of lines according to a second probability distribution from the second file, wherein the second file comprises a change between two consecutive snapshots of the second seed dataset;
      creating a third file comprising the lines sampled from the first file and the second file; and
      repeating to create a new file for every file in the first seed dataset to generate or augment training data for one or more machine-learning models.

2. The FMAT system of claim 1, wherein the first seed dataset comprises data points not corresponding to a ransomware attack.

3. The FMAT system of claim 1, wherein the second seed dataset comprises data points corresponding to a ransomware attack.

4. The FMAT system of claim 1, wherein the training data augmentation operations are performed by a backup system without impacting production operations in a production system served by the backup system.

5. The FMAT system of claim 1, wherein at least some of the training data augmentation operations are offloaded by the FMAT system to a cloud-based computing platform.

6. The FMAT system of claim 1, wherein the one or more machine-learning models includes an anomaly model or an encryption model or both.

7. A computer-implemented method, by a filesystem metadata augmentation technique (FMAT) system, the FMAT system including one or more processors configured to training data augmentation operations including, at least:
generating or accessing a first file sampled from a first seed dataset associated with a negative target class, and sampling a first number of lines according to a first probability distribution from the first file, wherein the first file comprises a change between two consecutive snapshots of the first seed dataset;
generating or accessing a second file sampled from a second seed dataset associated with a positive target class, and sampling a second number of lines according to a second probability distribution from the second file, wherein the second file comprises a change between two consecutive snapshots of the second seed dataset;
creating a third file comprising the lines sampled from the first file and the second file; and
repeating to create a new file for every file in the first seed dataset to generate or augment training data for one or more machine-learning models.

8. The method of claim 7, wherein the first seed dataset comprises data points not corresponding to a ransomware attack.

9. The method of claim 7, wherein the second seed dataset comprises data points corresponding to a ransomware attack.

10. The method of claim 7, wherein the training data augmentation operations are performed by a backup system without impacting production operations in a production system served by the backup system.

11. The method of claim 7, wherein at least some of the training data augmentation operations are offloaded by the FMAT system to a cloud-based computing platform.

12. The method of claim 7, wherein the one or more machine-learning models includes an anomaly model or an encryption model or both.

13. A non-transitory, machine-readable medium storing instructions which, when read by a machine, cause the machine to perform operations comprising, at least:
generating or accessing a first file sampled from a first seed dataset associated with a negative target class, and sampling a first number of lines according to a first probability distribution from the first file, wherein the first file comprises a change between two consecutive snapshots of the first seed dataset;
generating or accessing a second file sampled from a second seed dataset associated with a positive target class, and sampling a second number of lines according to a second probability distribution from the second file, wherein the second file comprises a change between two consecutive snapshots of the second seed dataset;
creating a third file comprising the lines sampled from the first file and the second file; and
repeating to create a new file for every file in the first seed dataset to generate or augment training data for one or more machine-learning models.

14. The medium of claim 13, wherein the first seed dataset comprises data points not corresponding to a ransomware attack.

15. The medium of claim 13, wherein the second seed dataset comprises data points corresponding to a ransomware attack.

16. The medium of claim 13, wherein the training data augmentation operations are performed by a backup system without impacting production operations in a production system served by the backup system.

17. The medium of claim 13, wherein at least some of the training data augmentation operations are offloaded to a cloud-based computing platform.

18. The medium of claim 13, wherein the one or more machine-learning models includes an anomaly model or an encryption model or both.

* * * * *